US009261668B2

(12) United States Patent  
Masuki

(10) Patent No.: US 9,261,668 B2  
(45) Date of Patent: Feb. 16, 2016

(54) OPTICAL DEVICE PROVIDED WITH ZOOMING MECHANISM

(71) Applicant: CANON KABUSHIKI KAISHA, Tokyo (JP)

(72) Inventor: Akihiko Masuki, Kawasaki (JP)

(73) Assignee: CANON KABUSHIKI KAISHA (JP)

( * ) Notice: Subject to any disclaimer, the term of this patent is extended or adjusted under 35 U.S.C. 154(b) by 0 days.

(21) Appl. No.: 14/455,234

(22) Filed: Aug. 8, 2014

(65) Prior Publication Data

US 2015/0043090 A1    Feb. 12, 2015

(30) Foreign Application Priority Data

Aug. 9, 2013  (JP) ................................. 2013-166266  
Jun. 23, 2014  (JP) ................................. 2014-128016

(51) Int. Cl.
  *G02B 15/14*   (2006.01)
  *G02B 7/10*    (2006.01)
  *G02B 7/02*    (2006.01)

(52) U.S. Cl.
  CPC . *G02B 7/10* (2013.01); *G02B 7/023* (2013.01)

(58) Field of Classification Search
  CPC ....................................................... G02B 7/10
  USPC ........................... 359/703, 704, 694, 676, 642
  See application file for complete search history.

(56) References Cited

U.S. PATENT DOCUMENTS

| 5,515,135 A | * | 5/1996 | Katayama | ............... G02B 7/10 396/529 |
| 5,892,988 A | * | 4/1999 | Uno | ..................... G02B 7/102 359/826 |

FOREIGN PATENT DOCUMENTS

| JP | 03160594 A | 7/1991 |
| JP | 09-211284 A | 8/1997 |
| JP | 11052217 A | 2/1999 |
| JP | 2003-131105 A | 5/2003 |
| JP | 2008070550 A | 3/2008 |
| JP | 2013003514 A | 1/2013 |

OTHER PUBLICATIONS

Office Action issued in JP2014-128016, mailed on May 12, 2015.

* cited by examiner

*Primary Examiner* — Tuyen Tra  
(74) *Attorney, Agent, or Firm* — Rossi, Kimms & McDowell LLP

(57) ABSTRACT

An optical device, such as a lens or a light quantity adjusting member, can avoid an increase in its size and also reduce the start-up time without damaging its components. An extracting section, a convex section, and a concave section are formed in a fixing member side by side in an optical axis direction. A flexible board is extracted from the extracting section. The convex section located on the extracting section projects to an inner diameter side from the extracting section. The concave section located on the convex section is recessed to an outer diameter side of the extracting section. While the optical device shifts into an accommodated state, the flexible board contacts a part of the convex section, a first bending portion of the flexible board projects to an inner diameter side thereof, and a second bending portion of the flexible board is accommodated in the concave section.

9 Claims, 12 Drawing Sheets

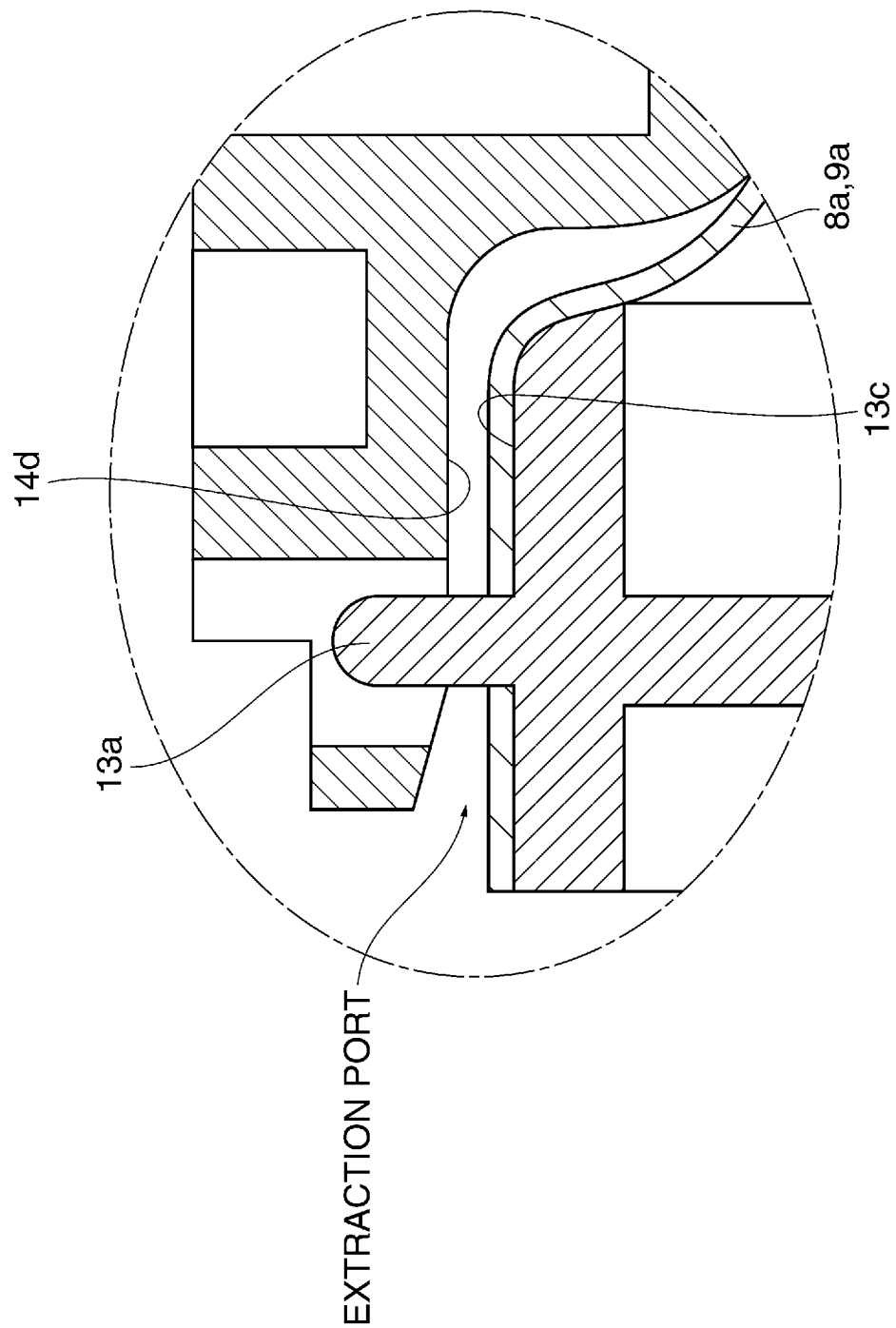

OPTICAL DEVICE PROVIDED WITH ZOOMING MECHANISM

BACKGROUND OF THE INVENTION

1. Field of the Invention

The claimed invention relates to an optical device provided with a zooming mechanism.

2. Description of the Related Art

There is known an image pickup apparatus including an optical device, such as an image pickup lens barrel, provided with a zooming mechanism configured to change image pickup magnification by moving a plurality of optical lenses in an optical axis direction. As the zooming mechanism of the image pickup lens barrel, there is known, for example, a mechanism configured such that a lens holding frame holding a lens is engaged with a cam groove of a rotating cam cylinder, and such that the rotation of the lens holding frame is regulated by a rectilinear motion barrel, so as to move the lens holding frame in the optical axis direction.

In the image pickup lens barrel provided with the zooming mechanism, the size of the image pickup lens barrel itself tends to be reduced in accordance with the improvement of lens specifications. However, with the reduction of the size of the image pickup lens barrel, the stroke (extension amount) between extension and retraction times of a light amount adjusting member, which is required to be electrically connected by a flexible board inside and outside of the image pickup lens barrel, has been increased. For this reason, it has become difficult that a long flexible board corresponding to the stroke is accommodated in a U-shape conventionally used in general.

In order to accommodate the long flexible board in a space in the image pickup lens barrel at the time of retraction without increasing the size of the image pickup lens barrel, many studies have been made on a method for increasing the space itself in the image pickup lens barrel, and on a method for efficiently folding the long flexible board into the space. For example, at the time of the retraction of the image pickup lens barrel, the image pickup apparatus is in a non-image-pickup state. By using this, a technique has been proposed, in which a part of the flexible board is made to enter into the optically effective light path of the image pickup lens barrel at the time of the retraction of the image pickup lens barrel (see Japanese Laid-Open Patent Publication (Kokai) No. 9-211284). The technique is configured such that a space required only when the image pickup lens barrel is in an image pickup state is efficiently used at the time of the retraction of the image pickup lens barrel, and thereby the space for accommodating the flexible board is substantially expanded.

However, in the technique described in Japanese Laid-Open Patent Publication (Kokai) No. 9-211284, a flexible member, such as the flexible board, the accommodated state of which is unstable, is made to enter the optically effective light path of the image pickup lens barrel. For this reason, when the flexible board is made to enter the optically effective light path of the image pickup lens barrel, there is also a possibility that the flexible board is brought into contact with a lens, so as to damage the lens. Further, when the flexible board is made to enter the optically effective light path of the image pickup lens barrel, a time period during which the flexible board can be completely retracted from the optically effective light path needs to be added to a time period from when the power supply of the image pickup apparatus is turned on to when an object image formed on an image pickup element is outputted. This results in a problem that the start-up time of the image pickup apparatus is increased.

SUMMARY OF THE INVENTION

The claimed invention provides an optical device, such as a lens or a light quantity adjusting member, which, even in a specification with a long extension stroke thereof, can avoid an increase in the size of the optical device and can also reduce the start-up time without damaging components in the optical device.

In a first aspect of the claimed invention, there is provided an optical device comprising a holding member configured to hold an optical member and to be movable in an optical axis direction of the optical member, a fixing member arranged on an outer diameter side of the holding member, and an electrical unit connected to a flexible board and configured to be movable in the optical axis direction, in the same manner as the holding member, wherein at least a part of an extracting section, a convex section, and a concave section are formed in the fixing member side by side in the optical axis direction, the flexible board is extracted from the extracting section, the convex section is located on an image surface side of the extracting section and formed to project to an inner diameter side from the extracting section, the concave section is located on an image surface side of the convex section and formed to be recessed to an outer diameter side of the extracting section, and while the optical device is shifting into an accommodated state, the flexible board is brought into contact with at least a part of the convex section, and a first bending portion of the flexible board is made to project to an inner diameter side thereof, and the second bending portion of the flexible board is accommodated in the concave section.

According to the claimed invention, when the optical device is in a retracted state, the flexible board is accommodated in an S-shape by using a convex section and a concave section which are provided at a fixing member. Therefore, the flexible board is not accommodated in the optically effective light path of the optical device. For this reason, an increase in the size of the optical device can be avoided, and the components in the optical device are also prevented from being damaged. Further, when the optical device is started and when an object image formed on an image pickup element is then outputted, it is not necessary to wait for the flexible board to be retracted from the optically effective light path of the optical device. Therefore, even in an optical device with a high specification having a long extension stroke of an optical member, such as lens, or a light quantity adjusting member, the start-up time of the optical device can be reduced.

Further features of the claimed invention will become apparent from the following description of exemplary embodiments (with reference to the attached drawings).

BRIEF DESCRIPTION OF THE DRAWINGS

FIG. 7B is a view showing a main part A shown by a broken-dotted line in FIG. 7A.

DESCRIPTION OF THE EMBODIMENTS

The claimed invention will now be described in detail with reference to the drawings showing preferred embodiments thereof. It should be noted that the relative arrangement of the components, the numerical expressions and numerical values set forth in these embodiments do not limit the scope of the claimed invention unless it is specifically stated otherwise.

Figure 1:
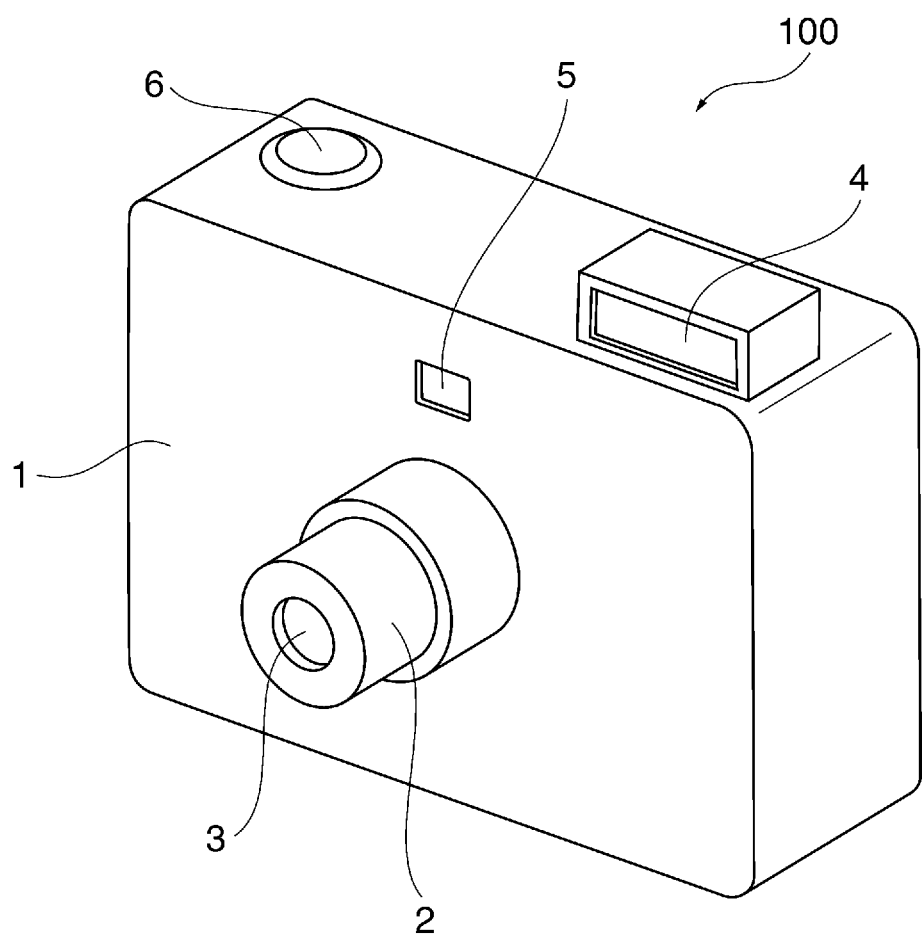
FIG. 1 is an external perspective view of an image pickup apparatus provided with an image pickup lens barrel as an optical device according to an embodiment the claimed invention.

FIG. 1 is an external perspective view of an image pickup apparatus 100 provided with an image pickup lens barrel 2 as an optical device according to an embodiment of the claimed invention. It should be noted that the optical device according to the claimed invention is not limited to those having the external configuration of the image pickup apparatus 100 shown in FIG. 1.

The image pickup lens barrel 2 configured to be able to change the focal length of an image pickup lens (not shown) is arranged on the front surface of a camera main body 1 of the image pickup apparatus 100. A lens barrier device 3 configured to open and close the optical path of the image pickup lens according to turning on and off of the image pickup apparatus 100 is provided on the front surface of the image pickup lens barrel 2. A light emission window section 4 configuring a stroboscope device for irradiating illumination light to a subject is arranged on the upper surface of the camera main body 1, and a viewfinder window 5 is provided on the front surface of the camera main body 1. A release button 6 for starting image pickup preparation operation (e.g. focusing operation, photometric operation, and the like), and starting image pickup operation (i.e. exposure to a film or an image sensor (image pickup element)) is provided on the upper surface of the camera main body 1.

First Embodiment

Figure 2:
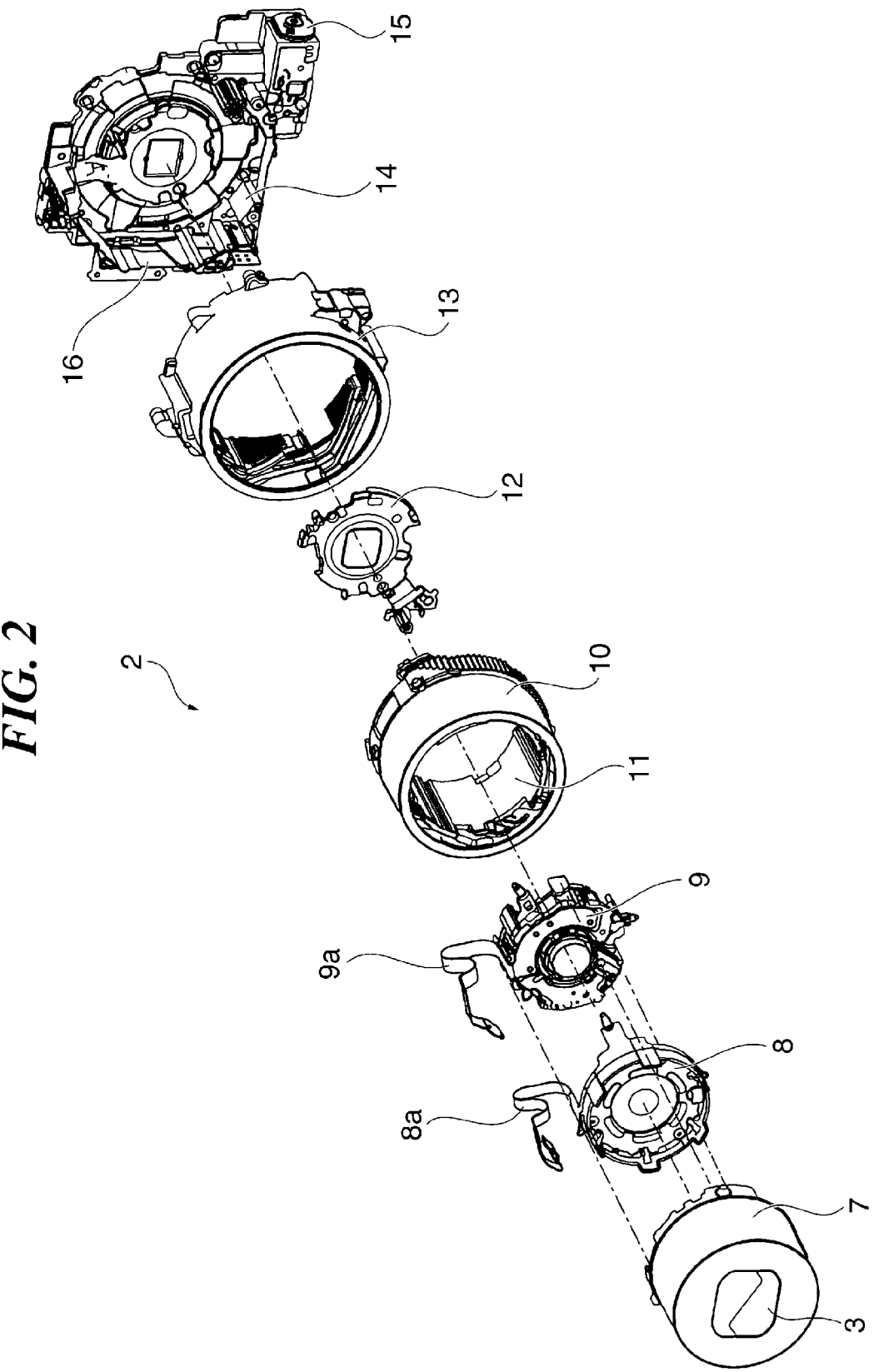
FIG. 2 is an exploded perspective view of the image pickup lens barrel provided in the image pickup apparatus of FIG. 1.

FIG. 2 is an exploded perspective view of the image pickup lens barrel 2 provided in the image pickup apparatus 100 of FIG. 1. The image pickup lens barrel 2 includes a first group lens barrel 7, a diaphragm unit 8, a second group lens barrel 9, a moving cam ring 10, a rectilinear motion barrel 11, a third group lens barrel 12, a fixed cylinder 13, an image pickup element holding member 14, a lens barrel drive motor 15, and a lens barrel flexible board 16.

The first group lens barrel 7 holds a first group image pickup lens L1 (see FIG. 5 to FIG. 7B), and is provided with the lens barrier device 3. The diaphragm unit 8 is provided with a diaphragm member as one of light quantity adjusting members, and adjusts the quantity of light guided to a film or an image sensor. Further, the diaphragm unit 8 is provided with a diaphragm flexible board 8a connected to the drive section of the diaphragm unit 8. The second group lens barrel 9 holds a second group image pickup lens L2 (see FIG. 5 to FIG. 7B), and is provided with an anti-vibration lens mechanism and a shutter member as one of the light quantity adjusting members. Further, the second group lens barrel 9 is provided with a shutter flexible board 9a connected to the shutter driving section of the second group lens barrel 9.

The moving cam ring 10 is provided, at its inner circumferential portion, with a drive cam (cam groove) for moving the first group lens barrel 7, the diaphragm unit 8, and the second group lens barrel 9 in the optical axis direction, and is also provided with a gear section to which power is transmitted from the lens barrel drive motor 15. The rectilinear motion barrel 11 is rotatably held at the moving cam ring 10, and regulates the linear movement of the first group lens barrel 7, the diaphragm unit 8, and the second group lens barrel 9. The third group lens barrel 12 holds a third group image pickup lens L3 (see FIG. 5 to FIG. 7B). The fixed cylinder 13 as one of the fixing members is provided, at its inner circumferential portion, with a drive cam for driving the moving cam ring 10. The image pickup element holding member 14 as one of the fixing members holds an image pickup element (image sensor such as a CCD sensor or a CMOS sensor), and is combined with the fixed cylinder 13 in the optical axis direction.

The lens barrel flexible board 16 is a main board electrically connected to the drive members provided at the image pickup lens barrel 2 as a whole. As described below, the diaphragm flexible board 8a and the shutter flexible board 9a are connected via a connector to the lens barrel flexible board 16 on the outer diameter side of the fixed cylinder 13. It should be noted that the image pickup lens barrel according to the claimed invention needs only be configured to satisfy the features of the invention described below, and is not limited to the configuration shown in FIG. 2.

Figure 3:
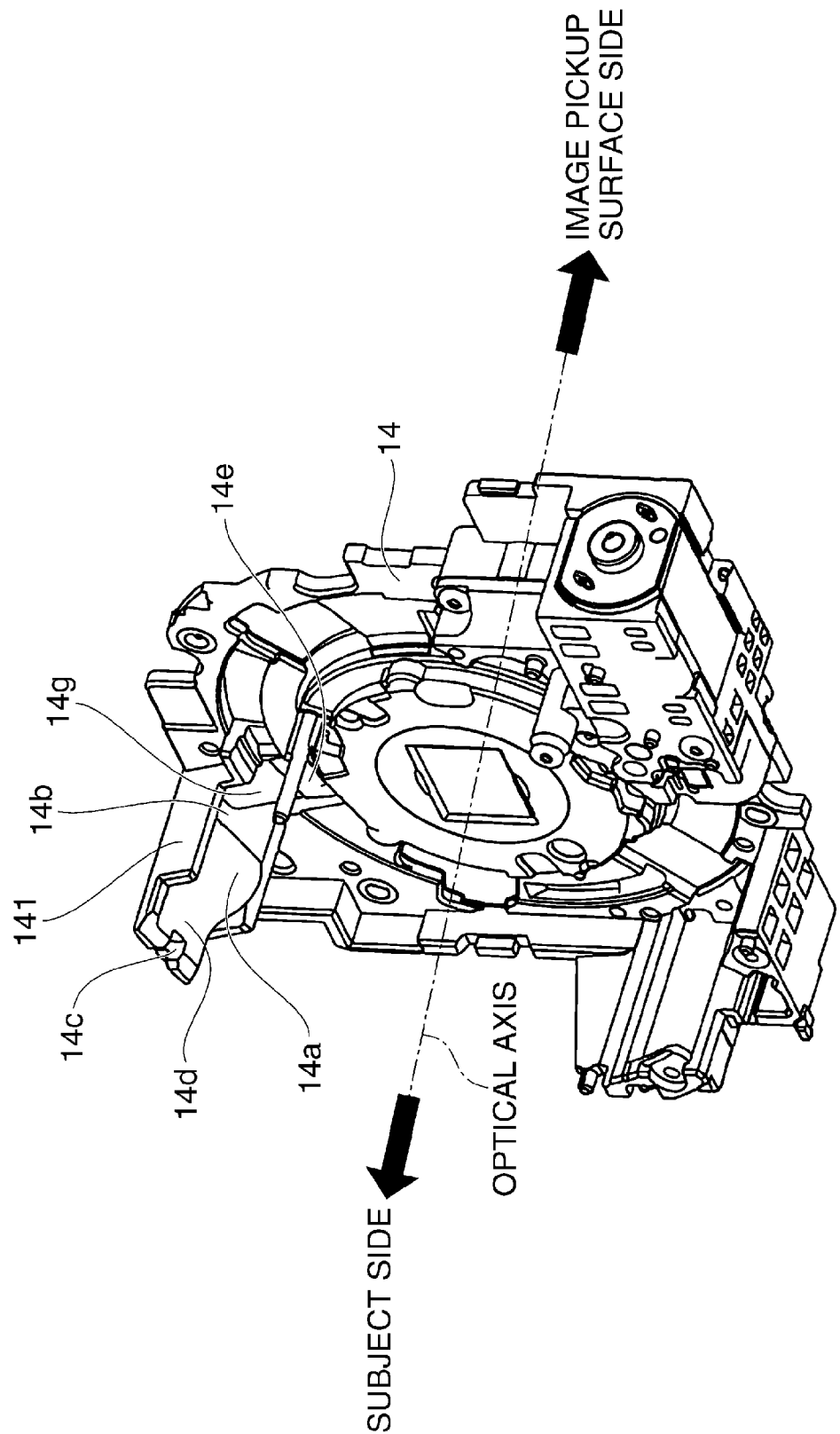
FIG. 3 is a perspective view showing a structure of an image pickup element holding member according to a first embodiment included in the image pickup lens barrel of FIG. 2.

Next, with reference to FIG. 3 and FIG. 4, there will be described how to lay and fix the diaphragm flexible board 8a of the diaphragm unit 8, and the shutter flexible board 9a of the second group lens barrel 9. FIG. 3 is a perspective view showing a structure of the image pickup element holding member 14 according to a first embodiment included in the image pickup lens barrel 2 of FIG. 2. As described below, the image pickup element holding member 14 is provided with shape portions necessary for accommodating the diaphragm flexible board 8a and the shutter flexible board 9a. It should be noted that, when two flexible boards of the diaphragm flexible board 8a and the shutter flexible board 9a are described in the following description, the two flexible boards are suitably described as "flexible boards 8a and 9a".

The image pickup element holding member 14 includes a wall member 141 which accommodates the flexible boards 8a and 9a and which is extended in the optical axis direction. A substantially semi-circular convex section 14a projecting from a radial position of an extraction port to the inner diameter side as described below is provided on the subject side of the wall member 141. On the image pickup surface side of the convex section 14a, a concave section 14b for accommodating the flexible boards 8a and 9a is provided on the outer diameter side of the radial position of the extraction port. The convex section 14a is formed by metal molding in which metal molds are respectively extracted to the subject side and the image pickup surface side in the optical axis direction. Therefore, in order to form the convex section 14*a*, it is necessary to provide, in a bottom surface 14*e*, a hole section 14*g* which has an area larger than an area obtained by projecting the convex section 14*a* to the image pickup surface side of the convex section 14*a* in the optical axis direction. In this case, it is necessary to prevent the flexible boards 8*a* and 9*a* from jumping out of the hole section 14*g* at the time of accommodation of the flexible boards 8*a* and 9*a*. Therefore, the hole section 14*g* is closed by using the flat surface of an image pickup surface side peripheral member of the image pickup lens barrel 2, or by using a sheet member (not shown).

Figure 4:
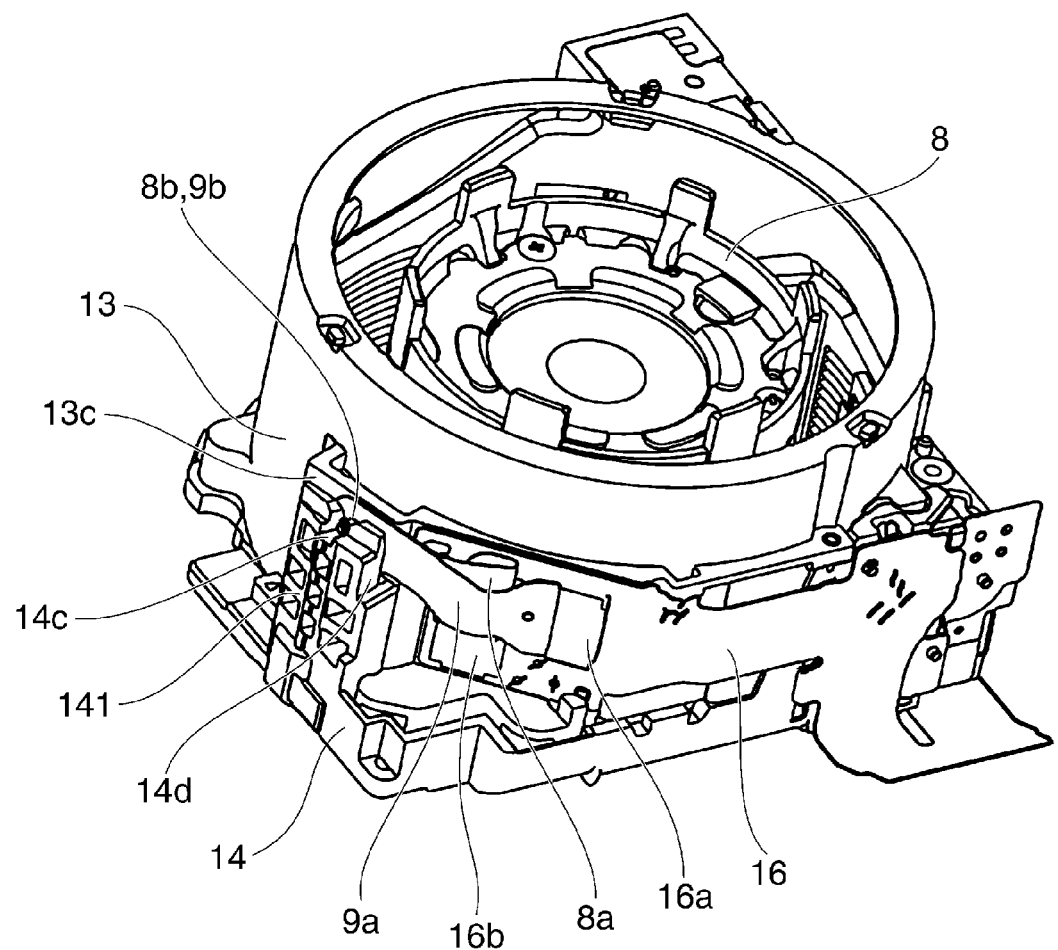
FIG. 4 is a perspective view showing a state in which a part of members of the image pickup lens barrel shown in FIG. 2 are assembled to the image pickup element holding member of FIG. 3.

FIG. 4 is a perspective view showing a state in which a part of members of the image pickup lens barrel 2 shown in FIG. 2 are assembled to the image pickup element holding member 14 of FIG. 3. In order to facilitate the understanding of the configuration, FIG. 4 shows a state in which only the diaphragm unit 8, the second group lens barrel 9, and the fixed cylinder 13 are assembled to the image pickup element holding member 14, and in which the lens barrel flexible board 16 is arranged.

In a stage before the flexible boards 8*a* and 9*a* are assembled to the image pickup element holding member 14, the positions of the flexible boards 8*a* and 9*a* are fixed, respectively, in a state in which a positioning dowel 13*a* of the fixed cylinder 13 is inserted into each of a positioning hole 8*b* of the diaphragm flexible board 8*a* and a positioning hole 9*b* of the shutter flexible board 9*a*. The flexible boards 8*a* and 9*a* are combined with the image pickup element holding member 14 so as not to be slackened at the TELE (telephoto) position (see FIG. 5) at which the diaphragm unit 8 and the second group lens barrel 9 are most extended. Further, the distal end portions of the flexible boards 8*a* and 9*a* are extracted to the outside of the fixed cylinder 13 from a gap (hereinafter referred to as "extraction port") formed by an outer surface 13*c* of the fixed cylinder 13, and an inner surface 14*d* of the wall member 141 of the image pickup element holding member 14 (see FIG. 3 and FIG. 7B).

The flexible boards 8*a* and 9*a*, the distal end portions of which are extracted to the outside of the fixed cylinder 13 from the extraction port, are respectively connected to a diaphragm connector section 16*b* and a shutter connector section 16*a* which are mounted at the lens barrel flexible board 16. Thereby, the electric conduction between the inside and outside of the image pickup lens barrel 2 is obtained. Here, the positioning dowel 13*a* of the fixed cylinder 13, which positions the flexible boards 8*a* and 9*a*, is made to enter a slit section 14*c* of image pickup element holding member 14 after being assembled to the image pickup element holding member 14. For this reason, even when the flexible boards 8*a* and 9*a* are moved in the direction of being separated from the positioning dowel 13*a*, the flexible boards 8*a* and 9*a* are regulated by the inner surface 14*d* of the wall member 141 of the image pickup element holding member 14, and hence are prevented from being extracted from the positioning dowel 13*a*. It should be noted that, in the present embodiment, the positioning dowel 13*a*, which fixes the positions of the flexible boards 8*a* and 9*a*, is provided at the fixed cylinder 13, and the slit section 14*c*, into which the positioning dowel 13*a* is inserted, is provided at the image pickup element holding member 14, but a reverse configuration may be adopted. That is, it may be configured such that a positioning dowel, which fixes the positions of the flexible boards 8*a* and 9*a*, is provided at the image pickup element holding member 14, and such that a slit section, into which the positioning dowel is inserted, is provided at the fixed cylinder 13. Such configuration can also be applied in a second embodiment and a third embodiment which will be described below.

Figure 5:
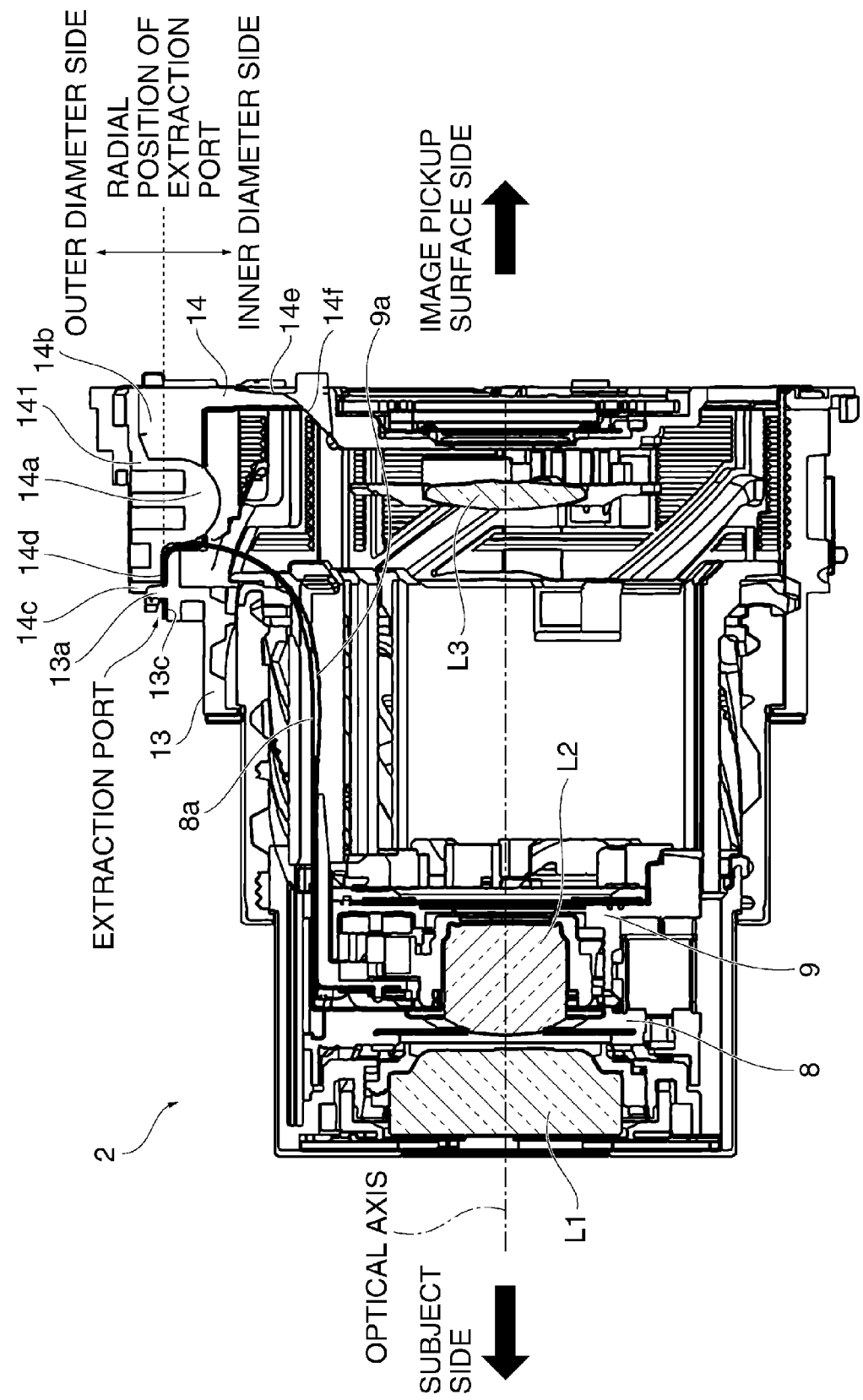
FIG. 5 is a cross-sectional view when the image pickup lens barrel of FIG. 2 is set at a TELE (telephoto) position of an image pickup state.
Figure 6:
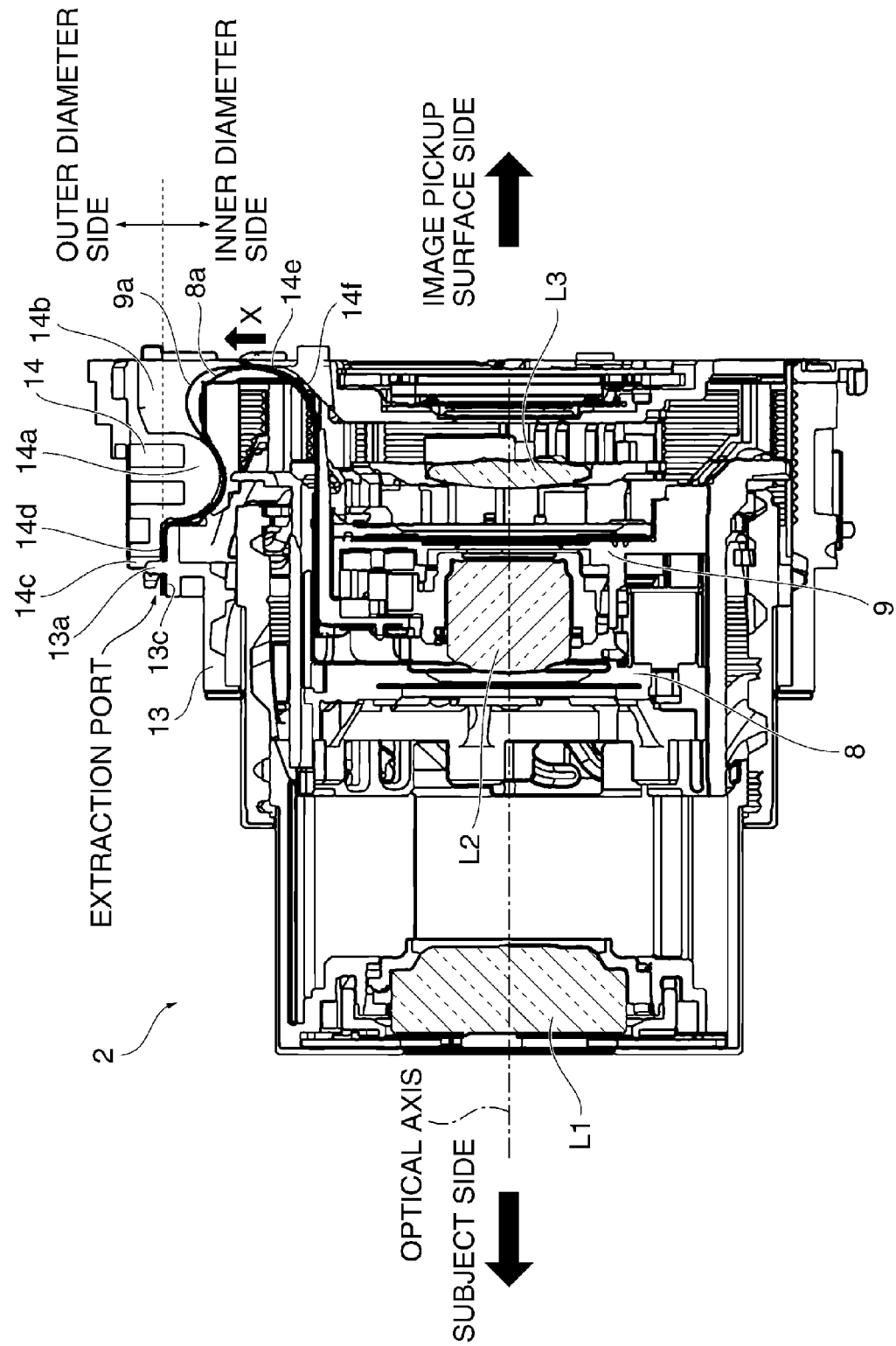
FIG. 6 is a cross-sectional view when the image pickup lens barrel of FIG. 2 is set in a WIDE (wide-angle) position of an image pickup state.
Figure 7A:
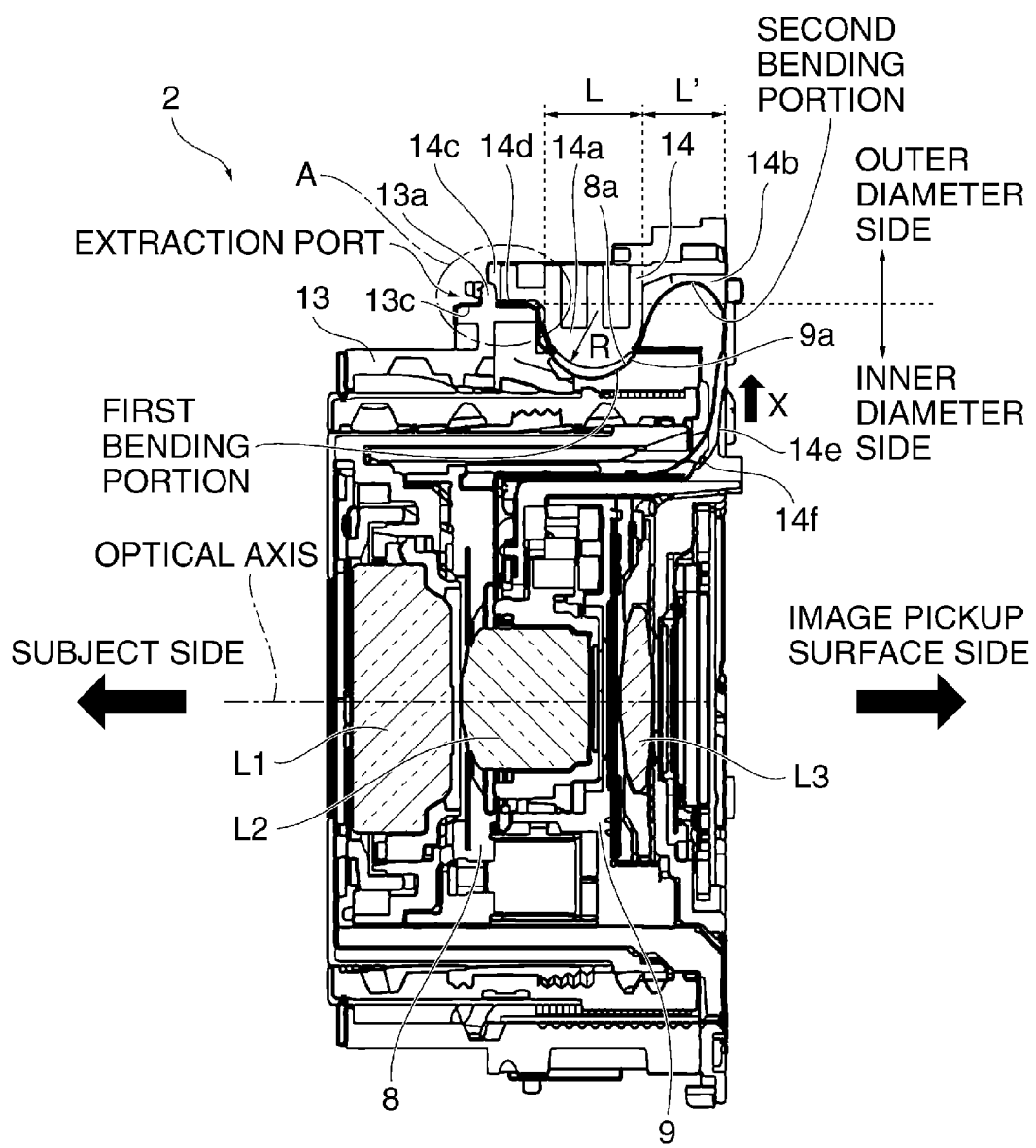
FIG. 7A is a cross-sectional view when the image pickup lens barrel of FIG. 2 is in a non-image pickup state (retracted state)

Next, the behavior of the flexible boards 8*a* and 9*a* at the time of accommodation will be described with reference to FIG. 5 to FIG. 7B. FIG. 5 is a cross-sectional view when the image pickup lens barrel 2 of FIG. 2 is set at a TELE (telephoto) position of an image pickup state. FIG. 6 is a cross-sectional view when the image pickup lens barrel 2 of FIG. 2 is set in a WIDE (wide-angle) position of an image pickup state. FIG. 7A is a cross-sectional view when the image pickup lens barrel 2 of FIG. 2 is in a non-image pickup state (retracted state), and FIG. 7B is a view showing a main part A shown by a broken-dotted line in FIG. 7A. Each of FIG. 5 to FIG. 7A is a cross-sectional view including the optical axis and obtained by cutting at each phase at which the behavior of the flexible boards 8*a* and 9*a* can be confirmed.

The flexible boards 8*a* and 9*a* are in a positional relationship in which the diaphragm flexible board 8*a* provided at the diaphragm unit 8 is made to pass on the outer diameter side of the shutter flexible board 9*a* provided at the second group lens barrel 9 located on the image pickup surface side of the diaphragm unit 8.

In the TELE position of FIG. 5, the diaphragm unit 8 and the second group lens barrel 9 are located at a most extended position (most extended to the subject side), and hence the flexible boards 8*a* and 9*a* are in the most extended state. The entire length of the flexible boards 8*a* and 9*a* is determined by a positional relationship between the diaphragm unit 8, the second group lens barrel 9, and the image pickup element holding member 14 when the diaphragm unit 8 and the second group lens barrel 9 are located at the most extended positions.

When the image pickup lens barrel 2 is moved from the TELE position in FIG. 5 in the retracting direction, both the diaphragm unit 8 and the second group lens barrel 9 are gradually moved to the image pickup surface side. At this time, the flexible boards 8*a* and 9*a* are brought into contact with the convex section 14*a* which is provided at the image pickup element holding member 14 so as to have a substantially semi-circular shape centered at the radial position of the extraction port and so as to project from the radial position of the extraction port to the inner diameter side. Also, the flexible boards 8*a* and 9*a* are wound by being guided along the circular arc shape of the convex section 14*a* to the inner diameter side of the image pickup lens barrel 2. Further, when the diaphragm unit 8 and the second group lens barrel 9 are moved in the retracting direction, until the flexible boards 8*a* and 9*a* are brought into contact with the bottom surface 14*e* of the image pickup element holding member 14, the flexible boards 8*a* and 9*a* are made to descend in a straight line from the vertex of the circular arc of the convex section 14*a* to the image pickup surface side, so as to become an U-shape.

When, after the flexible boards 8*a* and 9*a* are brought into contact with the bottom surface 14*e* of the image pickup element holding member 14, the retraction of the diaphragm unit 8 and the second group lens barrel 9 further proceeds, the area of the bottom surface 14*e* brought into contact with the flexible boards 8*a* and 9*a* is increased. That is, the flexible boards 8*a* and 9*a* are extended in the vertical direction of FIG. 6, and when the diaphragm unit 8 and the second group lens barrel 9 are further retracted, a part of flexible boards 8*a* and 9*a* rides on an inclined section 14*f* of the image pickup element holding member 14. Then, the force to move the diaphragm unit 8 and the second group lens barrel 9 to the image pickup surface side becomes a propulsive force, so that the flexible boards 8*a* and 9*a* are made to slide by receiving a component force from the inclined section 14f of the image pickup element holding member 14 in the arrow X direction of FIG. 6.

It should be noted that FIG. 6 shows a state after the flexible boards 8a and 9a is slightly moved by receiving the component force in the arrow X direction, and in FIG. 6, a part of the flexible boards 8a and 9a enters the image pickup surface side from the vertex of the circular arc of the convex section 14a along the convex section 14a of the image pickup element holding member 14.

When the diaphragm unit 8 and the second group lens barrel 9 are further retracted from the WIDE position of FIG. 6 to the image pickup surface side, so as to become the retracted state of FIG. 7A, the flexible boards 8a and 9a enter the concave section 14b provided on the image pickup surface side of the convex section 14a of the image pickup element holding member 14, so that the accommodation of the flexible boards 8a and 9a is completed. Here, as described above, the convex section 14a is projected to the inner diameter side from the radial position of the extraction port of the flexible boards 8a and 9a, and the concave section 14b is cut to the outer diameter side from the radial position of the extraction port. For this reason, the flexible boards 8a and 9a accommodated along the convex section 14a and the concave section 14b are formed in an S-shape including a first bending portion and a second bending portion as shown in FIG. 7A. Namely, the flexible boards 8a and 9a are brought into contact with at least a part of the convex section 14a, and the first bending portion of the flexible boards 8a and 9a is made to project to an inner diameter side thereof, and the second bending portion of the flexible boards 8a and 9a is accommodated in the concave section 14b. Therefore, the conventional flexible board is accommodated in a U-shape by being arranged straightly downward to the image pickup surface side from the extraction port, whereas the flexible boards 8a and 9a are accommodated in the state of being curved in the inner diameter side and the outer diameter side from the radial position of the extraction port. Therefore, the length of flexible boards 8a and 9a can be increased in correspondence with the difference between the length of the S-shaped portion and the length of the U-shaped portion.

The maximum optical direction lengths of the convex section 14a and the concave section 14b, respectively provided in the image pickup element holding member 14, can be set to be substantially equal to each other (lengths L and L' in FIG. 7A) in consideration of the dynamic stability of the flexible boards 8a and 9a. Further, the curvature radius R of the convex section 14a can be set to be as large as possible in the range in which, in order to reduce the bending load of the flexible boards 8a and 9a in the retracted state, the distance between the convex section 14a and the flexible boards 8a and 9a is maintained substantially equal to the distance between the concave section 14b and the flexible boards 8a and 9a. For example, the curvature radius R of the convex section 14a is set as $R \approx L/2$.

It should be noted that, in the present embodiment, the convex section 14a and the concave section 14b, which are used for accommodating the flexible boards 8a and 9a in the S-shape, are formed only in the image pickup element holding member 14, but it may also be configured such that the convex section 14a and the concave section 14b are formed only in the fixed cylinder 13, or such that the convex section 14a and the concave section 14b are formed by both the image pickup element holding member 14 and the fixed cylinder 13. Such configurations can also be applied to a second embodiment and a third embodiment which will be described below.

As described above, the present embodiment is configured such that, when the image pickup lens barrel 2 is in the retracted state, the flexible boards 8a and 9a are curved in the S-shape so as to be accommodated in the outer peripheral section of the image pickup lens barrel 2 without being accommodated in the optically effective light path of the image pickup lens barrel 2. Thereby, without increasing the size of the image pickup lens barrel, it is possible to accommodate the flexible boards 8a and 9a which are longer than before, and to cope with the image pickup lens barrel whose stroke for extending the diaphragm unit 8 and the second group lens barrel 9 is longer than before. Further, in the present embodiment, the components in the image pickup lens barrel 2 are not damaged, and it is not necessary to take into consideration the motion of the flexible boards 8a and 9a during the period from the retracted state to the start of image pickup operation. Therefore, it is possible to reduce the start-up time.

In the following, modifications of the convex section 14a, and the like, will be described with reference to FIG. 8 to FIG. 11. It should be noted that, in FIG. 8 to FIG. 11, the portions the same as those of the image pickup element holding member 14 described in the first embodiment are denoted by the same reference numerals and characters.

Second Embodiment

In the first embodiment, the portion of the image pickup surface side of the concave section 14b for accommodating the flexible boards 8a and 9a has a structure (a structure with the hole section 14g formed in the bottom section 14e) in which a bottom portion used for accommodating the flexible boards 8a and 9a in the image pickup lens barrel 2 is not provided. For this reason, as described above, it is necessary to close the hole section 14g by using the flat surface of the member on the image pickup surface side of the image pickup lens barrel 2, or by using a sheet member (not shown). In this case, there is a problem that the number of components is increased to increase the cost, and there is a possibility that damage, and the like, of the flexible boards 8a and 9a is caused by the friction at the time when the flexible boards 8a and 9a are made to slide on the surface of peripheral members.

In order to solve this problem, a second embodiment is configured such that the convex section 14a of the image pickup element holding member 14 is modified, and a bottom section for accommodating the flexible boards 8a and 9a in the image pickup lens barrel 2 is provided at the hole section 14g formed on the image pickup surface side of the concave section 14b.

Figure 8:
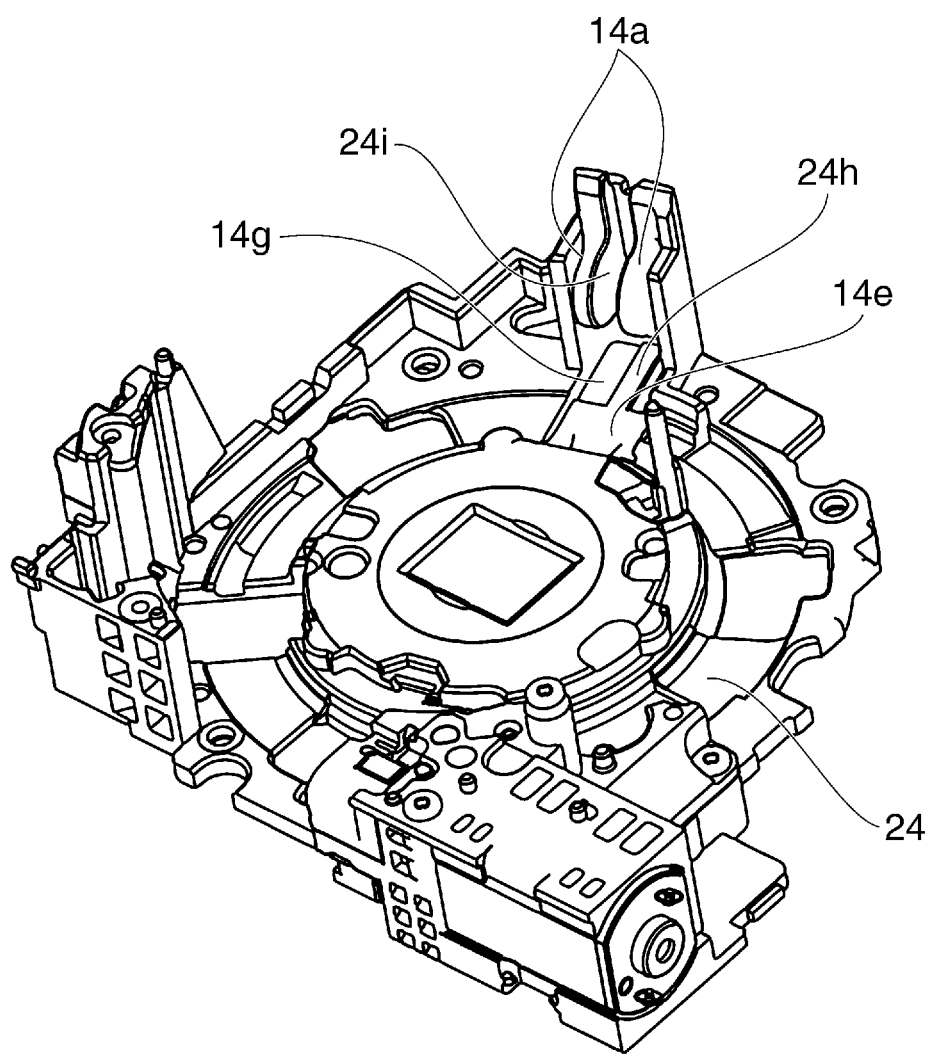
FIG. 8 is a perspective view showing a structure of an image pickup element holding member according to a second embodiment.

FIG. 8 is a perspective view showing a structure of an image pickup element holding member 24 according to the second embodiment. The image pickup element holding member 24 is different from the image pickup element holding member 14 according to the first embodiment in that a bottom section 24h connected to the bottom surface 14e is provided at the center of the hole section 14g, and in that a penetrating section 24i having a width equal to or more than the width of the bottom section 24h is provided at the center of the convex section 14a. Therefore, when the bottom section 24h is projected to the subject side in the optical axis direction, the bottom section 24h is substantially fitted in the range of the penetrating section 24i.

When the bottom section 24h is formed by metal molding, it is necessary to extract the metal mold to the subject side in the optical axis direction, and hence the convex section 14a needs to have a shape which allows the metal mold to pass therethrough. To cope with this, in the image pickup element holding member 24, the penetrating section 24i is used for passing the metal mold. The bottom section 24h prevents the flexible boards 8a and 9a from jumping out to the outside of the image pickup lens barrel 2, and also plays a role of properly adjusting the surface roughness which causes frictional resistance when the flexible boards 8a and 9a are made to slide in the direction to the concave section 14b.

Figure 9:
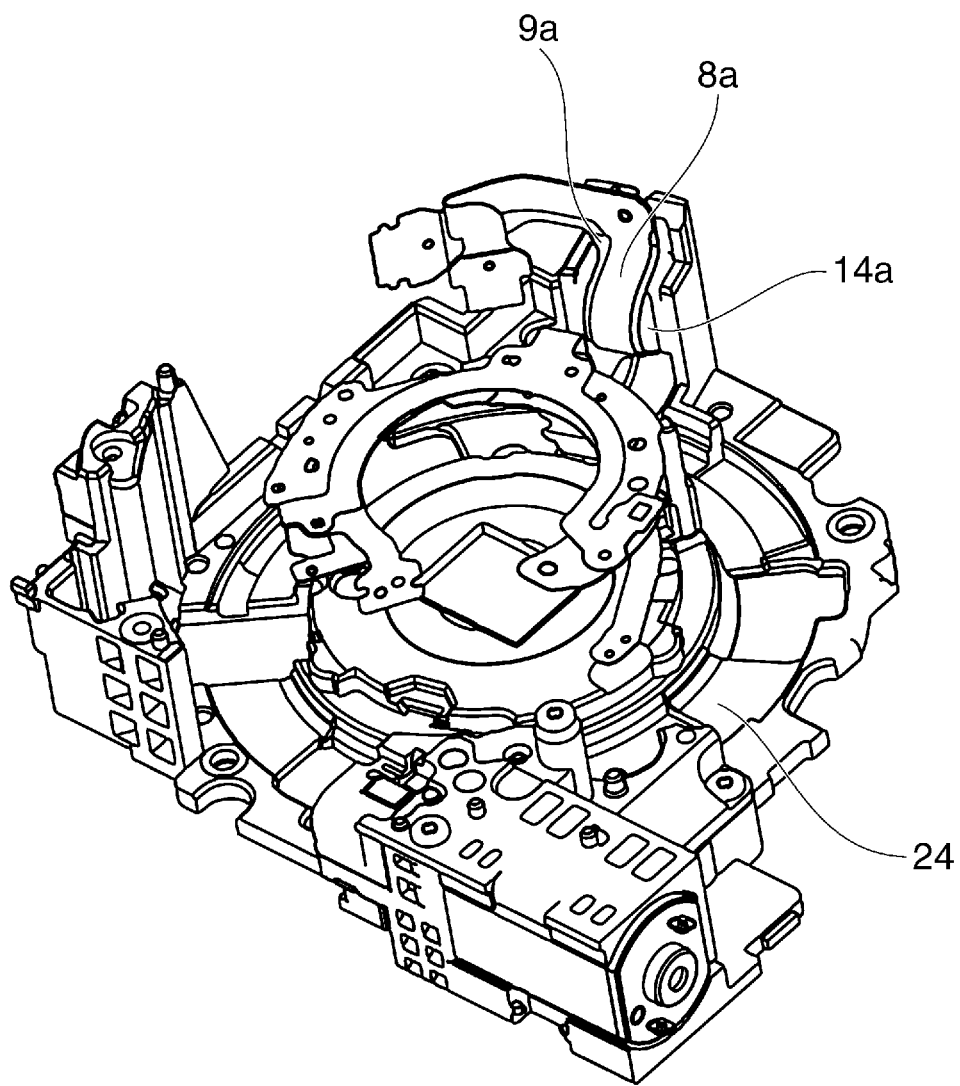
FIG. 9 is a perspective view showing a state where only flexible boards are arranged at the image pickup element holding member of FIG. 8.

FIG. 9 is a perspective view showing a state where only flexible boards 8a and 9a are arranged at the image pickup element holding member 24 of FIG. 8. Similarly to the first embodiment, also in the image pickup element holding member 24, the flexible boards 8a and 9a are made to move along the circular arc shape of the convex section 14a at the time of accommodation of the flexible boards 8a and 9a. At this time, since the penetrating section 24i is formed at the center of the convex section 14a, the width-direction both ends of the shutter flexible board 9a are brought into contact with the convex section 14a. Further, the width-direction center portion of the shutter flexible board 9a is brought into contact with the bottom section 24h of the image pickup element holding member 24. In this way, in the present embodiment, the width-direction both ends and the width-direction center portion of the shutter flexible board 9a are selectively used at the time of accommodation of the shutter flexible board 9a.

It should be noted that the penetrating section 24i of the convex section 14a of the image pickup element holding member 24 is covered by the shutter flexible board 9a which is brought into contact with the convex section 14a. For this reason, the width of the diaphragm flexible board 8a may be smaller than the width of the penetrating section 24i.

As described above, also in the present embodiment, the same effect as the first embodiment can be obtained. Further, with the present embodiment, it is possible to reduce the number of components, and it is also possible to accommodate the flexible boards 8a and 9a in the image pickup lens barrel 2 while reducing the damage of the flexible boards 8a and 9a due to friction caused when the flexible boards 8a and 9a are made to slide.

Third Embodiment

In the case where the shutter flexible board 9a is provided with an anti-vibration wiring pattern, it is expected to further increase the width of the shutter flexible board 9a. To cope with this, in the third embodiment, the image pickup element holding member 14 described in the first embodiment is modified.

Figure 10:
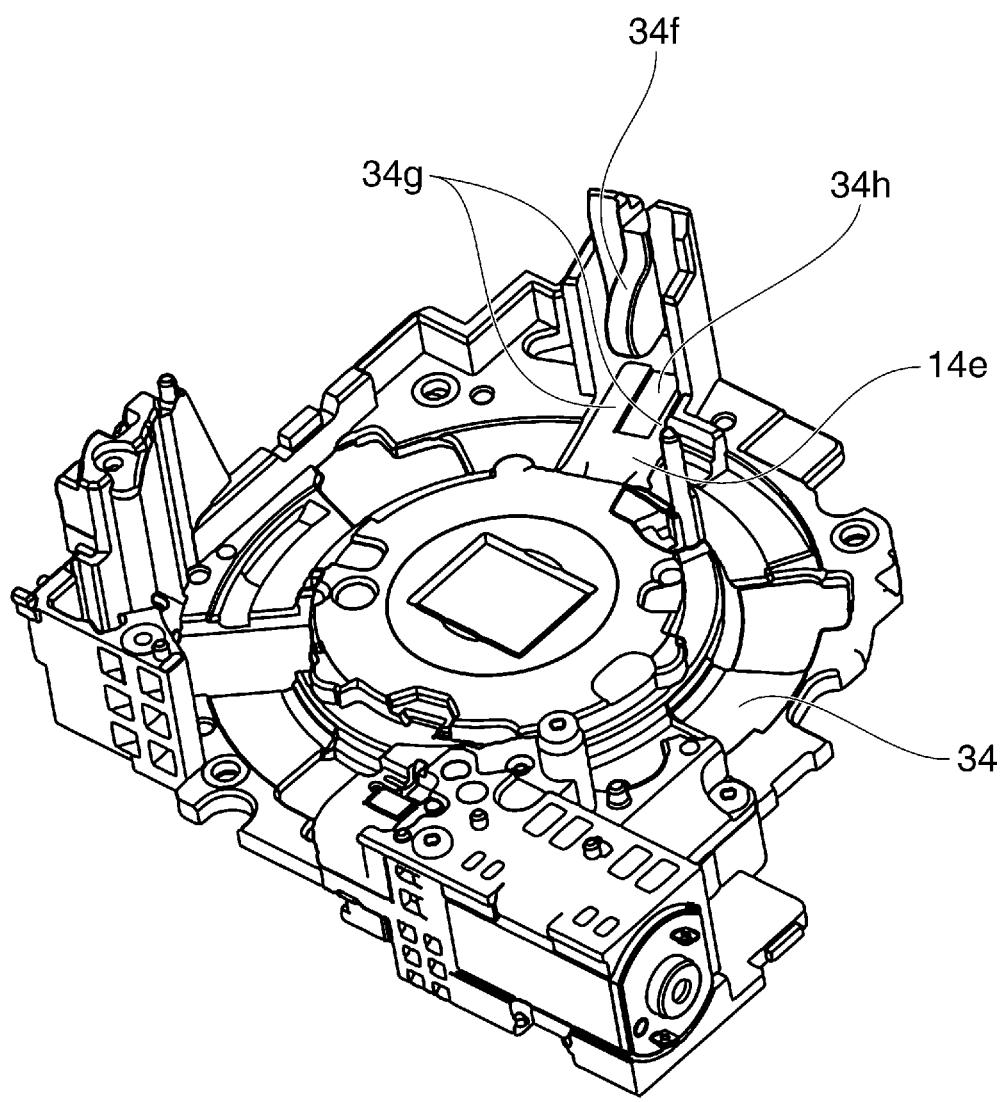
FIG. 10 is a perspective view showing a structure of an image pickup element holding member according to a third embodiment.

FIG. 10 is a perspective view of a structure of an image pickup element holding member 34 according to a third embodiment. The image pickup element holding member 34 is different from the image pickup element holding member 14 according to the first embodiment in that a bottom section 34g connected to the bottom surface 14e is formed at each of both ends of the hole section 14g (see FIG. 3), and in that a through hole 34h resulting from the hole section 14g is formed between the two bottom sections 34g. The convex section 14a, both end portions of which are carved to leave a portion having a width equal to or less than the width of the through hole 34h that is not closed by the bottom section 34g, is thereby configured such that a semi-circular projecting section 34f is formed only at a central portion thereof. In other words, a portion of the convex section 14a, which portion is equal to or more than the width of the bottom section 34g, is carved, and thereby the semi-circular projecting section 34f is formed. Therefore, when the semi-circular projecting section 34f is projected to the image pickup surface side in the optical axis direction, the semi-circular projecting section 34f is substantially fitted in the range of the through hole 34h.

When the two bottom sections 34g are formed by metal molding, it is necessary to extract the metal mold to the subject side in the optical axis direction, and hence the convex section 14a needs to have a shape allowing the passage of the metal mold. To cope with this, the image pickup element holding member 34 is configured such that the both sides of the semi-circular projecting section 34f in the convex section 14a can be used for passing the metal mold. The two bottom sections 34g prevent the flexible boards 8a and 9a from jumping out to the outside of the image pickup lens barrel 2, and also play a role of properly adjusting the surface roughness which causes frictional resistance when the flexible boards 8a and 9a are made to slide in the direction to the concave section 14b.

Figure 11:
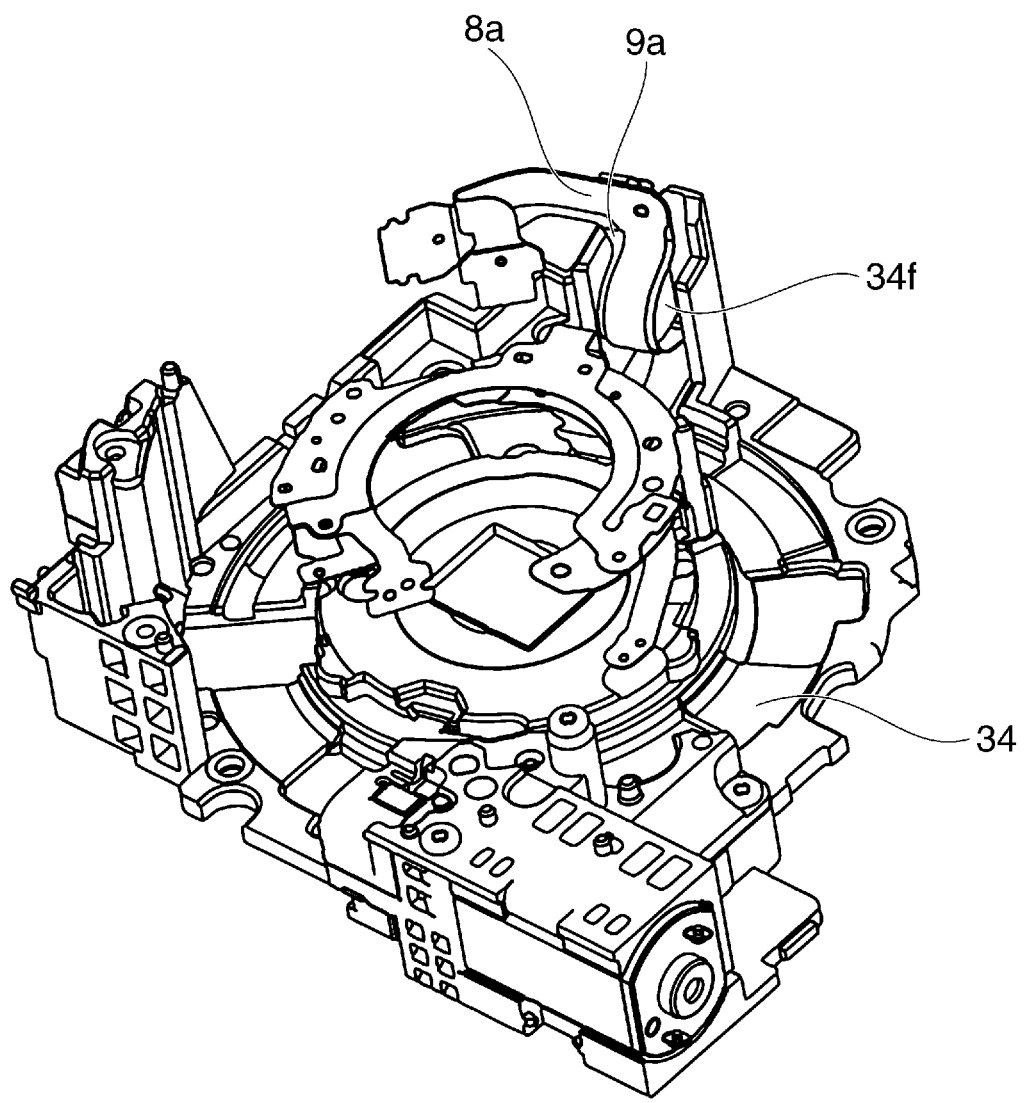
FIG. 11 is a perspective view showing a state where only flexible boards are arranged at the image pickup element holding member of FIG. 10.

FIG. 11 is a perspective view showing a state where only the flexible boards 8a and 9a are arranged at the image pickup element holding member 34 of FIG. 10. The image pickup element holding member 34 has a configuration in which the semi-circular projecting section 34f having a narrow width is formed by carving both sides of the convex section 14a. For this reason, at the time of accommodation of the flexible boards 8a and 9a, the width-direction center portion of the shutter flexible board 9a is brought into contact with the semi-circular projecting section 34f so as to make the flexible boards 8a and 9a move along the circular arc shape of the semi-circular projecting section 34f. On the other hand, the width-direction both ends of the shutter flexible board 9a are brought into contact with the two bottom sections 34g of the image pickup element holding member 34. In this way, also in the present embodiment, similarly to the second embodiment, the width-direction center portion and the width-direction both ends of the shutter flexible board 9a are selectively used for accommodation of the shutter flexible board 9a.

It should be noted that the through hole 34h of the image pickup element holding member 34 is covered by the shutter flexible board 9a which is brought into contact with the bottom sections 34g, and hence the width of the diaphragm flexible board 8a may be smaller than the width of the through hole 34h. As described above, with the present embodiment, it is possible to obtain the same effect as the effect of the second embodiment.

While the claimed invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-166266, filed Aug. 9, 2013 and Japanese Patent Application No. 2014-128016, filed Jun. 23, 2014, which are hereby incorporated by reference herein in their entirety.

What is claimed is:

1. An optical device comprising:
    a holding member configured to hold an optical member and to be movable in an optical axis direction of the optical member;
    a fixing member arranged on an outer diameter side of the holding member; and
    an electrical unit connected to a flexible board and configured to be movable in the optical axis direction, in the same manner as the holding member,
    wherein at least a part of an extracting section, a convex section, and a concave section are formed in the fixing member side by side in the optical axis direction, the flexible board is extracted from the extracting section, the convex section is located on an image surface side of the extracting section and formed to project to an inner diameter side from the extracting section, the concave section is located on an image surface side of the convex section and formed to be recessed to an outer diameter side of the extracting section, and while the optical device is shifting into an accommodated state, the flexible board is brought into contact with at least a part of the convex section, and a first bending portion of the flexible board is made to project to an inner diameter side thereof, and the second bending portion of the flexible board is accommodated in the concave section.

2. The optical device according to claim 1, wherein the convex section of the fixing member is formed into a substantially semi-circular shape centered at a radial position of the extracting section so as to project to the inner diameter side.

3. The optical device according to claim 1, wherein maximum optical axis direction lengths of the convex section and the concave section, each provided at the fixing member, are substantially equal to each other.

4. The optical device according to claim 1, wherein a curvature radius of the convex section is substantially equal to a half of a maximum optical axis direction length of the convex section.

5. The optical device according to claim 1, wherein the electrical unit is a light quantity adjusting unit configured to adjust quantity of light incident on the optical member.

6. The optical device according to claim 1, wherein the fixing member is an image pickup element holding member configured to hold an image pickup element.

7. The optical device according to claim 1, wherein a hole section having an area larger than an optical axis direction projected area of the convex section is formed on an image surface side of the concave section of the fixing member, and wherein the hole section is closed by a sheet member.

8. The optical device according to claim 7, wherein a bottom section, brought into contact with the flexible board at a center portion of the flexible board in a width direction thereof when the optical device becomes in the accommodated state, is provided at the hole section formed in the fixing member, and a penetrating section not less in length in the width direction than the bottom section is provided at the center of the convex section.

9. The optical device according to claim 7, wherein two bottom sections, brought into contact with the flexible board at both ends of the flexible board in a width direction thereof when the optical device becomes in the accommodated state, are provided at the hole section formed in the fixing member, and the convex section is not larger in length in the width direction than a portion not closed by the two bottom sections.

* * * * *